United States Patent
Roth et al.

(10) Patent No.: US 7,076,647 B2
(45) Date of Patent: Jul. 11, 2006

(54) DYNAMIC KERNEL TUNABLES

(75) Inventors: Steven Roth, San Jose, CA (US);
Daniel Mathias, San Jose, CA (US);
Wade J. Satterfield, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 09/875,289

(22) Filed: Jun. 7, 2001

(65) Prior Publication Data

US 2002/0023211 A1 Feb. 21, 2002

Related U.S. Application Data

(60) Provisional application No. 60/210,856, filed on Jun. 9, 2000.

(51) Int. Cl.
*G06F 1/24* (2006.01)
(52) U.S. Cl. .................................................. 713/100
(58) Field of Classification Search ................. 713/100
See application file for complete search history.

(56) References Cited

U.S. PATENT DOCUMENTS

| | | | | |
|---|---|---|---|---|
| 5,634,058 A | * | 5/1997 | Allen et al. | 717/163 |
| 5,815,415 A | * | 9/1998 | Bentley et al. | 703/4 |
| 6,691,118 B1 | * | 2/2004 | Gongwer et al. | 707/100 |

OTHER PUBLICATIONS

Houtz, Phillip. AIX for Breakfast: A Guide for Programmers and System Administrators. 1996. Prentice Hall. (preface).*
Hewlett-Packard, "Dynamically Tunable Kernel Parameters in HP-UX 11i", Jul. 2000.*

* cited by examiner

*Primary Examiner*—Thuan N. Du
*Assistant Examiner*—Eric Chang (57) ABSTRACT

The present invention is directed to a method and apparatus in which a UNIX operating system can be configured or tuned without rebooting the system. Advantageously, the present invention is directed to a dynamic mechanism for updating kernel parameters which is persistent and lasts across reboots. The present invention provides a dynamic kernel tunable framework for changing tunables in a kernel without rebooting. A graphical user interface displays and is used to change graphical values and settings of dynamic tunables.

30 Claims, 4 Drawing Sheets

| Kernel Configuration rowan | | | | |
|---|---|---|---|---|
| File List View Options Actions | | | | |
| Pending Kernel based Upon: Current Kernel | | | | |
| Configurable Parameters | | | | 0 of 157 selected |
| Name | Current Value | Pending Value | Type | Associated Module |
| maxdsiz | 268435456 | 268435456 | Dynamic | N/A |
| maxfiles | 60 | 60 | Static | N/A |
| maxfiles_lin | 1024 | 1024 | Dynamic | N/A |
| maxssiz | 8380608 | 8380608 | Dynamic | M/A |
| maxswapchunks | 256 | 256 | Static | N/A |
| maxtsiz | 67108864 | 67108864 | Dynamic | N/A |
| maxuprc | 75 | 75 | Dynamic | N/A |
| maxusers | 32 | 32 | Static | N/A |
| maxvgs | 10 | 10 | Static | N/A |
| mesg | 1 | 1 | Static | N/A |

FIG. 4

DYNAMIC KERNEL TUNABLES

RELATED APPLICATION

The present application claims priority of U.S. Provisional Application Ser. No. 60/210,856, filed Jun. 9, 2000, entitled "DYNAMIC KERNEL TUNABLES", the disclosure of which is incorporated by reference herein in its entirety.

FIELD OF THE INVENTION

The present invention relates generally to UNIX operating systems, and more particularly, to a method and apparatus for tuning a UNIX operating system. Even more particularly, the present invention is directed to a method and apparatus in which a UNIX operating system can be configured or tuned without rebooting the system. Advantageously, the present invention is directed to a dynamic mechanism for updating kernel parameters which is persistent and lasts across reboots.

BACKGROUND OF THE INVENTION

The operating system (OS) kernel is the software forming the core or heart of an OS. The kernel is loaded into main memory first on startup of a computer and remains in main memory providing essential services, such as memory management, process and task management and disk management. The kernel manages nearly all aspects of process execution on a computer system. Processes may be typical programs such as word processors, spreadsheets, games or web browsers. Processes are also underlying tasks executing to provide additional functionality to either the operating system or to the user of the computer. Processes may also be additional processes of the operating system for providing functionality to other parts of the operating system, e.g., networking and file sharing functionality.

The kernel is responsible for scheduling the execution of processes and managing the resources made available to and used by processes. The kernel also handles such issues as startup and initialization of the computer system.

As described above, the kernel is a very important and central part of an OS. Additional software or code, be it a program, process, or task, is written for execution on top of or in conjunction with the kernel, that is, to make use of kernel-provided services, information and resources.

Configurable kernel parameters (known as "tunables") are usually managed manually.

Such things as the system hostname, the current time of day, and the identification of the boot device could all be considered kernel parameters in the broadest sense of the term. Seen that broadly, there are many different variables, parameters and settings that affect kernel behavior and also many different mechanisms by which the kernel is managed.

The term "tunables" however refers to the set of parameters that historically are compiled into the kernel image. This mechanism dates back to the earliest types of UNIX in the mid-70s. So do many of the tunables themselves, such as nproc, maxdsiz and semmns. Historically, the set of tunables was defined by a file called master and the per-system customized values of those tunables were stored in a file called either system or dfile. A program called config would read those files and use them to generate a file of C code (conf.c), which was then compiled and linked with the kernel code. This process is known as "rebuilding the kernel." The resulting customized kernel could then be booted and used.

Over the years prior to this invention, this process of configuring tunables has changed only superficially. The master file has been replaced with a directory full of files. The SAM program and mk_kernel command present simpler interfaces to this process. The kmtune command, part of the Dynamically Loadable Kernel Modules (DLKM) infrastructure, allows for multiple kernel modules to be configured using this process, each with their own master files, system files and resulting binary image. But throughout all of these enhancements prior to this invention, the bottom line has been the same: the kernel must be rebuilt and rebooted in order for the tunable value changes to take effect. With this invention in place, we define a static tunable as one whose value cannot be changed without rebooting the system. Usually a kernel rebuild is also required. But with this invention, a tunable may be either static or dynamic. A dynamic tunable is one that can be changed without rebooting the system.

Many UNIX users are greatly concerned with high availability. Businesses can incur significant losses when a critical system goes down for an hour. In many customer environments, it is often difficult to justify rebooting a system in order to tune it.

One difficulty with prior art approaches to dynamic tunables is that there is one mechanism used to change the value of a tunable while the system is running. An entirely separate and different mechanism is used to change the value of the tunable in a permanent fashion to last across reboots. Disadvantageously, the tunable needs to be changed twice.

SUMMARY OF THE INVENTION

An object of the present invention is to allow the values of kernel tunable parameters to be queried and set without rebooting the system.

Another object of the present invention is a handler function for each dynamic tunable that embodies the complexities of making that tunable dynamic.

Another object of the present invention is to provide tunable handlers which provide an interface to the tunables used by the kernel.

Still another object of the present invention is to store tunable settings in a persistent storage mechanism.

There are many different users of UNIX with as many different needs to optimize their systems for highest utilization of system resources. To satisfy the diverse needs of this broad customer base, the kernel provides a variety of configurable parameters (usually around 150 parameters) that allow users to customize the behavior of the kernel for specific environments. Using the present invention, it is possible to modify some of those configurable parameters and immediately have a more optimized system. UNIX users now have the ability to tune their systems without sacrificing system availability (meaning a reboot) to do so.

The present invention provides the advantage of being able to change tunable values without rebooting.

The dynamic kernel tunable framework adds to the UNIX kernel the following features:

- The ability to provide information to user space applications about the names, values and allowed ranges of all kernel tunable parameters.
- The ability to change the values and behaviors of kernel tunable parameters that are designed to fit into this framework.
- The ability to save those changes across reboots, making them essentially permanent.

These features are intended to allow UNIX administrators to change kernel tunables without having to reboot their systems, thereby improving the availability of UNIX.

The framework allows for different tunables to have different behaviors. They can be:

Static, compiled into the kernel, unable to be changed without rebuilding and rebooting.

Static, able to be changed without rebuilding the kernel but requiring a reboot to do so.

Dynamic, able to be changed without rebooting, but the change may only affect certain processes (for example, those that would be in compliance with a reduced resource limit).

Dynamic, taking effect immediately.

These handler functions all plug in to a generalized interface provided to system administrators so that they have a consistent mechanism for all tunable changes.

The use of tunable handler functions provides numerous advantages:

Each tunable can be made dynamic independently of the others: at a different time, by different people, using different methods and under different constraints.

Tunables can be made dynamic without needing any centralized interface changes. Only the code using the tunable needs to change.

New tunables can be created without needing any centralized interface changes.

The main problem solved by the use of tunable handlers is the maintenance problem that results from any dynamic tunables implementation that relies on a centralized mechanism for tunable changes. In such an implementation, any time tunables are added, made dynamic or otherwise modified, this centralized mechanism must be changed. It thus becomes a contention point for future modifications, and "hot spot" for frequent bug fixes. One problem in maintaining software patches comes from the use of header files. It is much easier to patch software if the user only has to apply one patch. HP and other companies use cumulative patches to insure a user does not have to apply one or more other patches before they can apply the patch they need. (There can be reasons other than supersession that would require the user to need more than one patch.) In order for cumulative patches to work properly, each patch must include all of the patched files of any patch it supersedes. When a header file changes, all object files that were produced including the header file, must be patched together. If any of those object files were patched before, all files that were ever included in patches with those object files must also be included in the patch. Once these large patches are created, no subset of the files can be patched without redelivering all of the files of the large patch. This problem is known as "patch bubbling." The use of tunable handlers minimizes the content of common header files. This in turn, reduces the chance that patch bubbling will be a problem.

These and other objects of the present invention are achieved by a method of updating tunables used in a kernel which remain persistent across computer reboots. A system file is updated including tunables having a tunable setting with a new tunable value in response to a single administrator request. A persistent storage mechanism is simultaneously updated including tunables having a tunable setting with the new tunable value in response to the single administrator request. A tunable value is changed in the kernel with the new tunable value and continuing to run the computer with the updated tunable value.

The foregoing and other objects of the present invention are achieved by a method of rebuilding a kernel. Tunable settings are retrieved which are stored in a system file. The kernel is rebuilt using the retrieved tunable settings. A persistent storage mechanism is updated using the retrieved tunable settings.

Another object of the present invention is achieved by a dynamic kernel tunable framework for changing tunables in a kernel without rebooting. A graphical user interface displays and changes graphical values and settings of dynamic tunables. A system call interface interfaces the user interface with a system file, a persistent storage mechanism and the kernel. A handler function interface interfaces to the system call interface and the kernel includes information about each dynamic tunable.

Another object of the present invention is achieved by a computer architecture including updating means for updating a system file including tunables each having tunable setting with a new tunable value in response to a single administrator request. Updating means are provided for simultaneously updating a persistent storage mechanism including tunables each having tunable setting with the new tunable value in response to the single administrator request. Changing means are provided for changing a tunable value in the kernel with the new tunable value and continuing to run the computer with the updated tunable value.

Another object of the present invention is achieved by a computer architecture including retrieving means for retrieving tunable settings stored in a system file, rebuilding means for rebuilding the kernel using the retrieved tunable settings and updating means for updating a persistent storage mechanism using the retrieved tunable settings.

Another object of the present invention is achieved by an article including at least one sequence of machine executable instructions. A medium bears the executable instructions in machine readable form and execution of the instructions by one or more processors causes the one or more processors to retrieve a system file including tunables each having tunable setting with a new tunable value in response to a single administrator request. The processor simultaneously retrieves a persistent storage mechanism including tunables each having tunable setting with the new tunable value in response to the single administrator request and changes a tunable value in the kernel with the new tunable value. The computer continues to run with the retrieved tunable value.

Another object of the present invention is achieved by an article including at least one sequence of machine executable instructions. A medium bears the executable instructions in machine readable form, wherein execution of the instructions by one or more processors causes the one or more processors to retrieve tunable settings stored in a system file, rebuild the kernel using the retrieved tunable settings, and update a persistent storage mechanism using the retrieved tunable settings.

Another object of the present invention is achieved by a computer system including a processor, a memory coupled to the processor, the memory having stored therein sequences of instructions, which, when executed by the processor, causes the processor to perform the steps of updating a system file including tunables each having tunable setting with a new tunable value in response to a single administrator request, simultaneously update a persistent storage mechanism including tunables each having tunable setting with the new tunable value in response to the single administrator request, and change a tunable value in the kernel with the new tunable value and continuing to run the computer with the updated tunable value.

Another object of the present invention is achieved by a computer system including a processor; and a memory coupled to said processor, the memory having stored therein sequences of instructions, which, when executed by said processor, causes said processor to perform the steps of update tunable settings stored in a system file, rebuild the kernel using the retrieved tunable settings, and update a persistent storage mechanism using the retrieved tunable settings.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for tuning an HP-UX operating system kernel are described. It should be understood that the principles of the present invention can also be applied to other UNIX operating systems although the present invention is described with respect to the HP-UX operating system. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
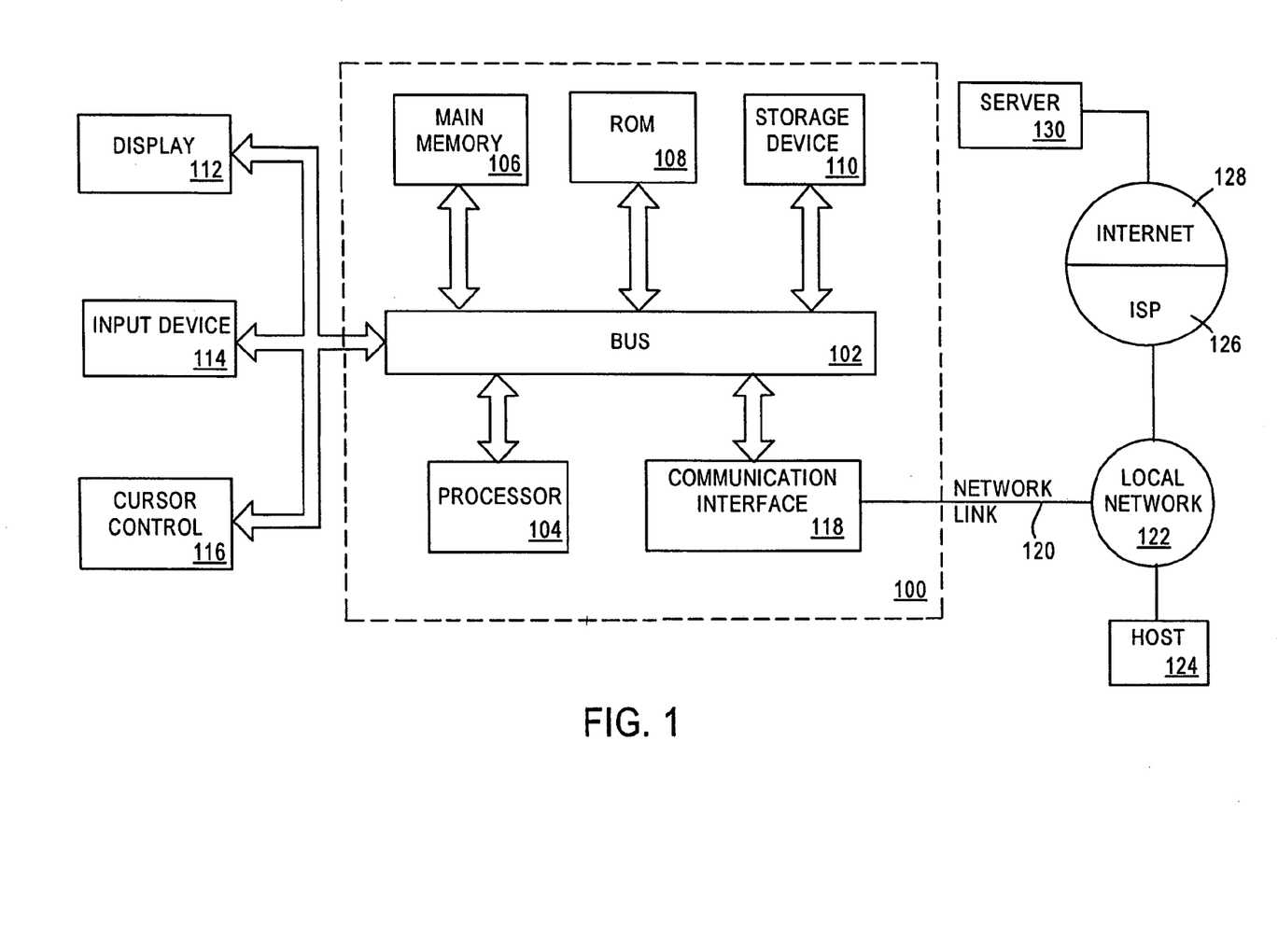
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display system administration manager graphical user interface. According to one embodiment of the invention, the system administration manager graphical user interface is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. Of particular note, the communications through interface 118 may permit transmission or receipt of the dynamic tunable settings. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send data and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

The following terms and definitions are used herein. A tunable parameter is any one of about between 50 and 300 variables (usually 150) that control the operation of the kernel, that are defined in the master files and set in the system files, and that are compiled into the kernel as a result of running the config program. Tunable parameters are variables stored in the kernel, that are not associated with any given program or process and can be changed by a system administrator. These tunable parameters generally control the allocation of caches within the kernel, limits on the amount of resources available globally or to individual processes, or features that may be included, excluded or changed in the kernel. A tunable is shorthand for tunable parameter. A parameter is shorthand for tunable parameter. A dynamic tunable is a tunable parameter whose value can be changed by a system administrator without requiring a reboot of the system to effect the change. A default value is the value assigned to a tunable parameter in the master file. Note that this value may be a function of the values of other tunable parameters. To change the values of static kernel parameters, the computer has to be shut down and the computer started over with new values. Persistent means that once a tunable value has been applied it stays in memory, can be reused multiple times and remains constant across reboots of the computer. In contrast, a tunable value which is not persistent reverts to a prior boot value after a reboot.

Figure 2:
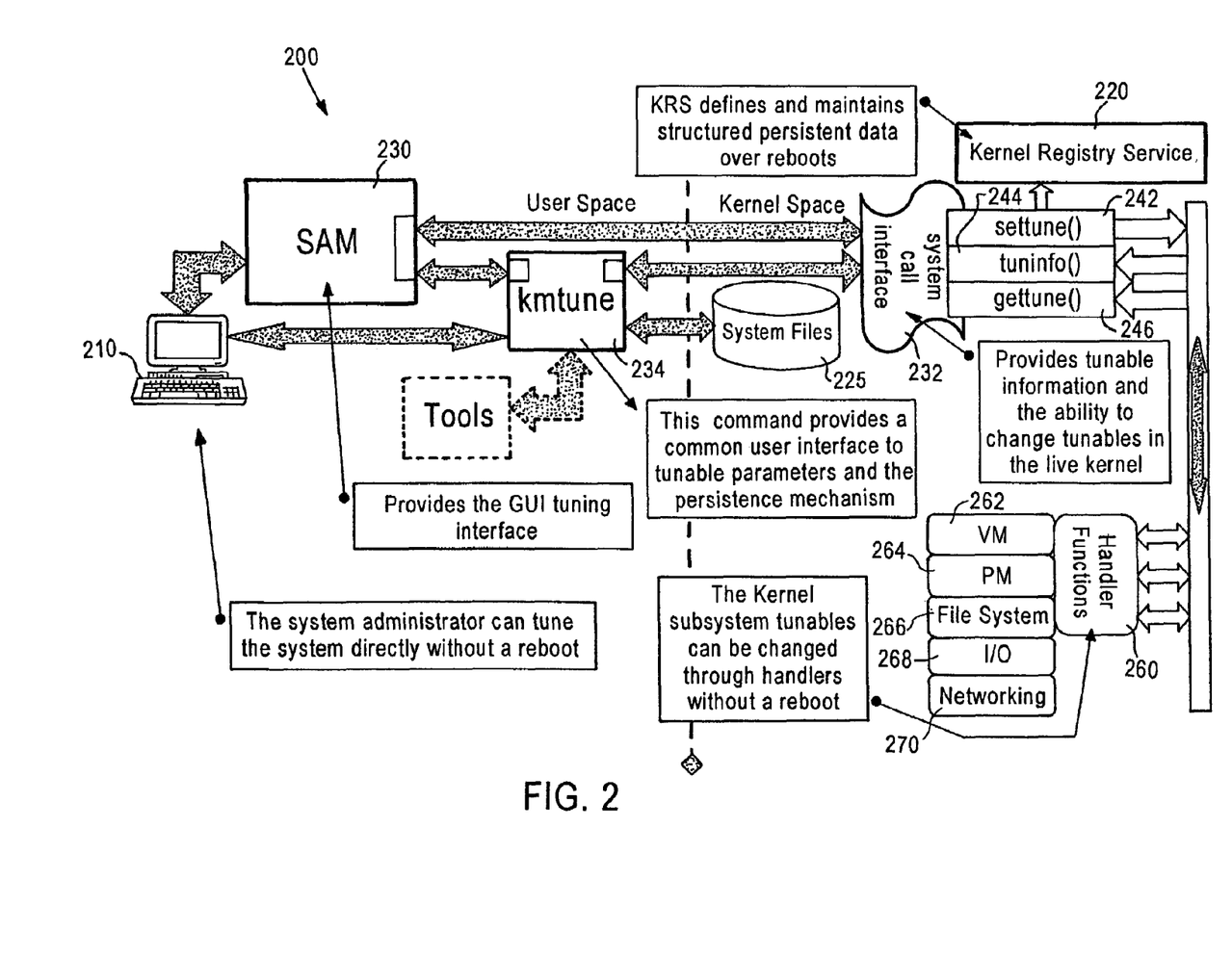
FIG. 2 is a flow diagram depicting a logical architecture according to the present invention.

Referring to FIG. 2, the dynamic kernel tunables framework includes four main pieces:

A data structure, maintained in the Kernel Registry Service 220 that includes information about every tunable parameter.

A backup data structure 225 statically compiled into the kernel, used to initialize the data structure in the Kernel Registry.

A set of APIs (settune( ) 242, tuneinfo( ) 244 and gettune( ) 246) for user space that allow commands to retrieve tunable information and change tunable settings.

Handler functions 260 for each tunable which understand the semantics of a tunable and when and how to change it.

During normal system operation, the Kernel Registry Service 220 will include detailed information about every kernel tunable (including those which are not dynamic). The information includes its current value, its allowed range of values, a printable description of it, and so on.

Referring again to FIG. 2, a flow diagram entitled "Dynamic Kernel Tunables Value Chain" is illustrated. In FIG. 2, a computer 210 is used by the system administrator who can tune the OS kernel controlling the operation of system 210 directly without a reboot. The administrator can update a kernel registry service 220 and the system files 225 using the application called kmtune 234, which uses the UNIX command line and provides a common user interface to the tunable parameters and the persistence mechanism. Alternatively, the administrator can use the system administration manager (SAM) 230, which is a graphical user interface. SAM 230 translates the administrator's actions into invocations of the kmtune application. The kmtune application can directly change the values in the kernel registry service 220 and the system files 225 through a system call interface 232. The system call interface 232 includes three calls: settune( ) 242, tuneinfo( ) 244 and gettune( ) 246 which will be discussed in detail below.

These calls 242, 244, 246 interface 232 with handler functions 260, one for each dynamic tunable. Handler functions are supplied for tunables belonging to the Virtual Memory subsystem 262, the Process Management subsystem 264, the File System 266, the Input/Output subsystem 268, and the Networking subsystem 270, among others. The kernel sub-system tunables can be changed through the handler function 260 without a reboot.

There are a number of different methods available for changing tunables. As described below, these methods are arranged from the most user-friendly method (SAM 230), kmtune 234, to the lowest level method (kernel system call APIs). SAM is the System Administration Manager 230, a tool supplied with all HP-UX systems. Many system administrators have used this tool for changing tunable values. SAM handles all the necessary file changes, kernel rebuild and reboot automatically.

Figure 3:
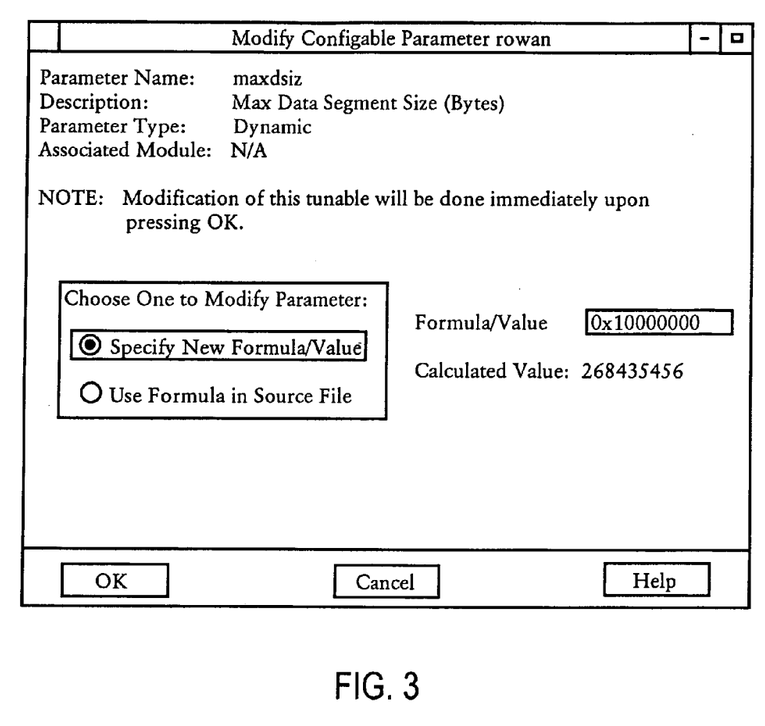
FIG. 3 is an illustration of a graphical interface screen provided by an SAM.

Referring now to FIG. 3, in HP-UX 11i, SAM 230 can be used to change tunable values. Any time a tunable is changed using SAM 230, it will inform the administrator whether or not that tunable change requires a reboot. If no reboot is required, SAM 230 will then proceed to make the tunable change immediately.

Figure 4:
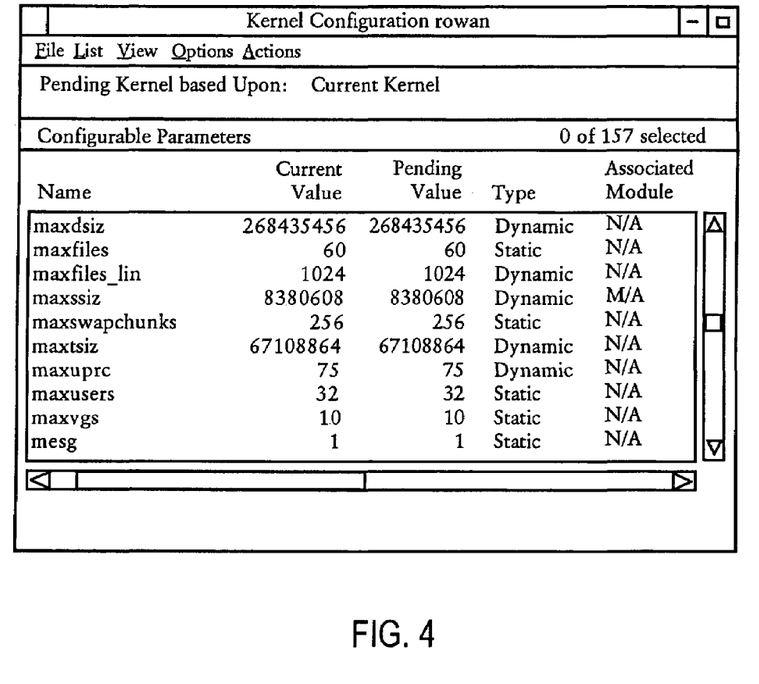
FIG. 4 is another screen provided by the SAM.

Referring to FIG. 4, In SAM's configurable parameters screen, administrators can tell at a glance whether or not the value of a particular tunable can be changed without a reboot. Those that can be changed without a reboot are marked "Dynamic", those that require a reboot are marked "Static."

The kmtune command 234 is HP-UX's supported method of changing the values of tunable parameters from the command line. kmtune will update the proper system file 225 to define a new value for a specified tunable. The next time the kernel is compiled, it will incorporate the new value of the tunable. The administrator can compile the kernel using the mk_kernel command and then reboot the system with the new kernel to complete the change. kmtune is also capable of tuning the tunables defined by DLKM (Dynamically Loadable Kernel Modules). When changing a DLKM tunable the DLKM must be unloaded, recompiled and reloaded to incorporate the new tunable value.

When kmtune is invoked with the −u flag, in addition to changing the system file, kmtune will also change the value of the tunable being used by the currently running kernel. In this case, no kernel rebuild or reboot is required.

Software developers can write software that changes tunable parameters using the settune API 242. Such changes will remain effective only until the next time the kernel is rebuilt, since settune does not modify the system files like kmtune does. The gettune 246 and tuneinfo 244 APIs can be used to retrieve information about tunables and their current values.

Two mechanisms are used to ensure that tunable value changes remain persistent: the system files 225 and the Kernel Registry Service (KRS) 220. These mechanisms keep tunable value changes persistent across reboots, as long as the kernel is neither rebuilt nor renamed. The tunable values also remain persistent across kernel rebuilds when changed using SAM 230 or kmtune 234. Although the term KRS is used herein, it should be understood that any persistent parameter storage device can be used. For example, the KRS is stored in a disk file although any persistent store, such as a disk or an EEPROM can be used. It is only necessary that the kernel parameters are stored to insure that they can be re-read after rebooting the system. The system files (or /stand/system) are used to store the kernel parameter values used when the kernel is rebuilt. This usage refers to a kernel build environment where kernel parameters have traditionally been set at the time the kernel is compiled and linked, also called rebuilt. In general, however, tunable value changes do not remain persistent when a kernel is renamed or when switching between two kernels with different names.

All tunable value changes made through either method (including SAM or kmtune) will remain persistent when the kernel reboots, as long as it is neither rebuilt nor renamed. If settune 242 is used then the tunable value change will be persistent only across kernel reboots and not across kernel rebuilds. Tunable values are stored in the KRS 220, a persistent storage mechanism. Every time the system boots, it retrieves the stored values of tunables from the KRS 220 and uses them. As a result, tunable value changes will persist across reboots.

It is important to note that the KRS 220 maintains a separate set of tunable values for each different kernel file name. Tunable changes made after booting the kernel /stand/vmunix will affect any future boots of /stand/vmunix, but will not affect any boots of /stand/vmunix.other. As a result, tunable changes are not persistent when a kernel is renamed, or which switching between two kernels are different names.

The system files 225 contain the tunable settings that are used when a kernel gets built. There is one file for the core kernel and another for each separately loadable kernel module.

SAM 230 and kmtune 234 automatically update these files whenever they are used to change a tunable value. kmtune can be used independently. If SAM is used, it does its work through kmtune. As a result, all subsequent kernel builds will incorporate the new value of a tunable. Therefore, all tunable changes that are made using SAM 230 or kmtune 234 will remain persistent across kernel rebuilds.

When a kernel gets rebuilt, the tunable data in the KRS 220 is erased and replaced with the tunable data in the system files 225. More precisely, the erasure and replacement happens when the rebuilt kernel is first booted. In most cases, this will not matter if SAM 230 or kmtune 234 is used to change tunable values. Both sources of data are kept in sync. However, the settune API 242 does not update the system files. Unless they are updated separately, the changes made using settune 242 will be lost when the kernel is next rebuilt.

The present application is written for one of ordinary skill in the art. Background information is available regarding kernel configuration in "Managing System Performance and Steps to Reconfigure the Kernel", in the chapter by that name in the HP-UX manual titled "Managing Systems and Workgroups: A Guide for HP-UX System Administrators" which is hereby incorporated by reference in its entirety into the specification, along with an excellent reference book entitled "HP-UX Tuning and Performance: Concepts, Tools, and Methods", First Edition, by Robert Sauers, published in July 1999 by Prentice Hall PTR, ISBN 0 13 102716-6.

Each dynamic tunable handler function 260 includes the calls to the following functions: DTOP_BOOT, DTOP_GETDATA, and DTOP_SETDATA. The handler calls DTOP_BOOT will synchronize the tuneinfo structure, which represents data from the previous boot of this kernel and the current kernel's settings. In particular, the handler 260 should restore the previous current (or pending) value as the current value of the tunable.

The handler calls DTOP_GETDATA will set the tuneinfo structure to accurately reflect the current state of the tunable.

The handler calls DTOP_SETDATA will set the current value of the tunable to the value specified and the behavior of the tunable as specified by the flags field. It should also update the tuneinfo structure to reflect the resulting state of the tunable.

Kernel subsystems (VM 262, PM 264, File System 266, I/O 268, Networking 270, and others) are expected to register handler functions for the tunables to be made dynamic. These handler functions form the interface between the Dynamic Kernel Tunables Framework (which is a collective term for items 232, 242, 244, and 246) and the kernel subsystems. The handler functions encapsulate the knowledge of how a tunable is used by the kernel, how it can be safely changed, what values are valid and what dependencies exist between its tunable's value and range and other tunables' values.

Kernel subsystems (262–270) should register their handlers by calling register_dyntune_handler. This should be done during boot and may be done any time after the framework has been initialized.

While the system 210 is running, user space applications will be able to access tunable information in any of several ways.

The values of certain small subsets of tunables can be queried using existing pstat or sysinfo mechanisms.

The value of any tunable can be queried with the new system call, gettune 246.

The list of tunables can be queried with the new system call, tuneinfo 244.

The detailed information about a tunable can be queried with tuneinfo 244.

In some cases, when specific tunables become dynamic, there may need to be some changes to how the kernel accesses them (such as additional locking).

The values of tunables can be changed in any of several ways.

The administrator can make changes using the existing kmtune 234 command and then rebuild and reboot their kernel.

Using the Dynamic Kernel Tunables' program, there are some tunables which can be changed without requiring a kernel rebuild. Those tunables can be changed by calling the system call settune.

The existing kmtune command 234 can be used to change tunables dynamically.

When settune 242 is called, to dynamically change the value of a tunable, it will call a handler function for that tunable, which will have been registered by the kernel subsystem that defines that tunable.

These handler functions are responsible for validating and executing tunable changes. Only tunables that have a handler function can be changed dynamically. Once a change has been validated and executed, the tunable information in the Kernel Registry Service 220 will be updated to reflect the change. At all subsequent boots, the new value of the tunable will be read from the Kernel Registry Service 220 and used in place of the value compiled into the kernel.

Kernel Registry Data

Tunable information is kept in the Kernel Registry Service 220, under the path "/kernel/tunables". This node, and all descendent nodes and attached values, will be marked kernel-specific, persistent and user-read-only (except as noted in the table below). These attributes mean, respectively, that each different kernel installed on a system may have its own data for these nodes, that the values are saved across reboots and that programs cannot change these values by talking to KRS 220 directly; the programs have to go through SAM 230, kmtune 234, or settune 246 to do so.

Under that path, there will be one node for each kernel tunable. The name of the node is the name of the tunable. Each such node has the following name/value pairs:

| Name | Type | Value |
|------|------|-------|
| description | string | An English printable description of the tunable. |
| module | string | The name of the kernel module defining the tunable. If the tunable is defined in the core kernel, this name/value pair will not be present. |
| current | [u]int64 | The current value of the tunable. |
| pending | [u]int64 | The pending value of the tunable, if any. If there is no pending value, this name/value pair will not be present. |
| boot | [u]int64 | The value of the tunable at the time of last boot. |
| default | [u]int64 | The default value of the tunable (as defined in the master files). |
| minimum | [u]int64 | The minimum value of the tunable, if any. If there is no minimum value, this name/value pair will not be present. |
| maximum | [u]int64 | The maximum value of the tunable, if any. If there is no maximum value, this name/value pair will not be present. |
| canset | unit32 | A Boolean value indicating whether or not the tunable can be changed using settune() (i.e., without a kernel rebuild). This value is not marked persistent. |
| dynamic | unit32 | A Boolean value indicating whether or not the tunable can be changed without a reboot. This value is not marked persistent. |
| canauto | unit32 | A Boolean value indicating whether or not the tunable can be automatically tuned by the kernel. This value is not marked persistent. |
| automatic | unit32 | A Boolean value indicating whether or not the tunable is being automatically tuned by the kernel. This value is not marked persistent. |
| private | unit32 | A Boolean value indicating whether or not tuneinfo() should exclude this tunable when asked for data about all tunables. |
| eventid | unit64 | The Kernel Event Notification ID number for the event associated with this tunable, if any. (In releases before KEN is available, this number is a simple index into a table of handler function pointers. This value is not marked persistent. |

The "/kernel/tunables" node itself will have one name/value pair. The name will be linkstamp, and the value will be a unique identifier for the binary of the kernel that entered the data in the registry. This will be used to double check, before restoring tunable values for the registry, that they were intended for the kernel we are currently running.

There are three system calls that are used by SAM 230 or kmtune 234 to interface with the KRS 220 and the system files 225. The kernel contains code for the new system calls gettune 246, tuneinfo 244 and settune 242.

gettune 246 will look up the specified tunable in the Kernel Registry. If the tunable has an associated handler, gettune will call that handler, with the code indicating that the handler should update the data structure for the tunable. The resulting value will be returned both to the Kernel Registry and to the caller. gettune 246 returns the current value of a specific tunable from the kernel. The gettune 246 function retrieves the current value of the kernel tunable parameter named tunable. The value is passed back through a supplied value pointer. The value returned is the value for the tunable that is being used by the currently running kernel. This interface will return the values of all publicly visible tunables, regardless of whether or not they are dynamically tunable.

settune 242 works much the same as gettune 246, except that the handlers are asked to change the data structure for their tunable rather than simply report it. Errors from the handler 260 are passed back to the caller of settune 242. When settune 242 succeeds, the changed data is placed into the persistent store 220 and put in use in the kernel as appropriate.

tuneinfo 244 when called for a specific tunable, works much the same was as gettune. tuneinfo is less like settune than gettune, except that the full data structure is returned to the caller, not just the value. The tuneinfo function 244 retrieves detailed information about kernel tunable parameters. This tuneinfo 244 function provides detailed information about one or all kernel tunable parameters.

When tuneinfo 244 is called to get information on all tunables, it will query the Kernel Registry Service 220 to get the complete list, and then filter out those marked "Private". It will call the handlers for any tunables that have associated handlers, with the "update" request mentioned above, and return the results of such calls to the Kernel Registry Service 220. It will then return information on all tunables (except the private ones) to its caller.

The tunable information table will add approximately 22 kB of the data to the kernel image. In the running system, this will be effectively doubled, since there will be a copy in the Kernel Registry Service 220 data structures as well.

Each tuneinfo_t structure describes a single tunable parameter and contains at least the following fields, in unspecified order:

char ti_name [TUNENAMELEN]; The name of the tunable parameter.

char ti_desc [TUNEDESCLEN]; An English description of the parameter.

char ti_mod [TUNEMODLEN]; The name of the DLKM module in which the parameter is defined. This will be an empty string for those parameters defined in the core kernel.

uint64_t ti_current; The current value of the parameter.

uint64_t ti_pending; The value of the parameter that will become current at the next opportunity. Valid only if the TIF_PENDING flag is set in the ti_flags word below.

uint64_t ti_bootvalue; The boot-time value of the parameter (compiled into the kernel).

uint64_t ti_default; The HP-supplied default value of the parameter.

uint64_t ti_min; The minimum value of the parameter. Valid only if the TIF_MINVALID flag is set in the ti_flags word, below.

uint64_t ti_max; The maximum value of the parameter. Valid only if the TIF_MAXVALID flag is set in the ti_flags word, below.

The minimum and maximum values returned here are relatively static limits. They will reflect the limitations of the operating system software and any limitations placed on this tunable parameter by the current values of other tunable parameters. However, they do not reflect any restrictions on the tunable value based on transient factors like the current usage pattern of the system.

For example, the maximum value returned for maxfiles (the number of files a process may have open) will be no greater than the current value of nfile (the number of files the system may have open). However, the minimum value returned for maxfiles may very well be less than the number of files that some existing process has open.

unsigned ti_Rags; A bitmask of zero or more of the following flags:

TIF_CANSET The value of this parameter can be changed using settune( ).

TIF_DYNAMIC The value of this parameter can be changed using settune( ), without requiring a reboot.

TIF_CANAUTO The kernel is capable of automatically tuning this parameter without operator intervention.

TIF_AUTOMATIC The kernel is currently automatically tuning this parameter.

TIF_PENDING A new value for this parameter has been set, and is waiting to take effect. See the description of settune( ) for an explanation of pending parameter changes.

TIF_SIGNED The values, minimum, and maximum for this parameter should be interpreted as signed quantities.

TIF_MINVALID The ti_minimum field contains a minimum allowed value for this parameter.

TIF_MAXVALID The ti_maximum field contains a maximum allowed value for this parameter.

The settune function 244 sets the value of a kernel tunable parameter. The settune function 244 sets the value of the kernel tunable parameter named tunable to the supplied value.

Different tunable parameters have different rules governing when they can be changed and what the changes mean. Here are the different possibilities:

Some parameters cannot be changed without rebuilding the OS kernel and then rebooting that rebuilt kernel. settune 242 will return an error (ENOTSUP) if asked to change one of these parameters.

Some parameter changes do not require a kernel rebuild, but still require that the kernel be rebooted. For these parameters, settune 244 will hold the new value as "pending" until the system reboots.

Some parameters represent limits on resources that can be consumed by individual processes. Each process has its own copy of these parameters and some of them can differ from one process to another if the setrlimit system call or an equivalent is used. For some per-process parameters, the new limits will only be enforced after a call to exec or fork.

The handler function 260 provides a handler for each tunable. A discussion of a skeleton of a dynamic tunable handler function is provided below. The skeleton can be modified to create new tunable handlers. The skeleton includes three calls DTOP_BOOT, DTOP_GETDATA and DTOP_SETDATA.

The DTOP_BOOT handler is called during boot. This handler restores the old value and behavior of the tunable and set the flags indicating how the tunable can be controlled during this boot. The DTOP_BOOT handler sets a flag if the tunable can be set without rebooting. Minimum and maximum values of the tunable are loaded from memory during the reboot. The DTOP_GETDATA handler is used to return current value of tunables.

The DTOP_SETDATA handler is used. The DTOP_SETDATA handler determines if the tunable value to be changed is within the minimum and maximum. This handler also determines if the change can be made immediately or if the changes need to be held pending.

kmtune 234 is used to query, set or reset system parameters. kmtune displays the value of all system parameters. kmtune reads the master files stored in Kernel Master Files and the system description files of the kernel and kernel modules. Information on the running kernel is gathered with the tuneinfo 244 system call. Changes to kernel parameters generally do not take effect until the kernel has been rebuilt and the system has been rebooted. Some kernel parameters can be changed in the running kernel. kmtune 234 with the –u option will alter these parameters and avoid the need to rebuild and reboot.

It should now be apparent that a method and apparatus have been described which a tunable can be dynamically changed and will remain persistent across computer reboots. Advantageously, high availability is achieved and the system can be used without having to reboot the system. This is achieved by providing handler functions which provide information about each dynamic tunable and by storing tunable value changes in a Kernel Registry Service and in system files.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of updating tunables used in a kernel which remain persistent across computer reboots, comprising:

updating a system file including tunables each having a tunable setting with a new tunable value in response to a single administrator request;

simultaneously updating a persistent storage mechanism including tunables each having a tunable setting with the new tunable value in response to the single administrator request;

changing a tunable value in the kernel with the new tunable value without needing any centralized interface changes and continuing to run the computer with the updated tunable value.

2. The method of claim 1, wherein said updating steps are performed using a system administrator's management application.

3. The method of claim 1, wherein updating steps are performed using a UNIX command line.

4. The method of claim 1, wherein the computer includes a UNIX operating system.

5. The method of claim 1, wherein the system file includes a file for a core kernel and another for each separately loadable kernel module.

6. The method of claim 1, further comprising compiling the kernel and incorporating the new tunable value into the kernel.

7. The method of claim 1, wherein the persistent storage mechanism is a Kernel Registry Service.

8. The method of claim 1, comprising retrieving a current value of a tunable setting.

9. The method of claim 1, comprising retrieving detailed information about one or more tunable settings.

10. The method of claim 1, comprising registering handler functions for a tunable handler for a particular tunable.

11. The method of claim 1, comprising interfacing with the kernel using a handler function.

12. A method of rebuilding a kernel, comprising:
retrieving tunable settings stored in a system file;
rebuilding the kernel using the retrieved tunable settings; and
updating a persistent storage mechanism without needing any centralized interface changes using the retrieved tunable settings.

13. The method of claim 12, further comprising:
erasing data stored in a persistent storage mechanism;
replacing the erased data with the retrieved tunable settings.

14. A dynamic kernel tunable framework for changing tunables in a kernel without rebooting, comprising:
a graphical user interface for displaying and changing graphical values and settings of dynamic tunables;
a system call interface for interfacing the user interface with a system file, a persistent storage mechanism and the kernel;
a handler function interface interfaced to the system call interface and the kernel including information about each dynamic tunable without needing any centralized interface changes.

15. The framework of claim 14, in which tunable changes are made immediately without rebooting and are also kept persistent across reboots, both actions taken as the result of a single administrator request.

16. A computer architecture, comprising:
updating means for updating a system file including tunables each having tunable setting with a new tunable value in response to a single administrator request;
updating means for simultaneously updating a persistent storage mechanism including tunables each having tunable setting with the new tunable value in response to the single administrator request; and
changing means for changing a tunable value in the kernel with the new tunable value without needing any centralized interface changes and continuing to run the computer with the updated tunable value.

17. A computer architecture, comprising:
retrieving means for retrieving tunable settings stored in a system file;
rebuilding means for rebuilding the kernel using the retrieved tunable settings; and
updating means for updating a persistent storage mechanism without needing any centralized interface changes using the retrieved tunable settings.

18. An article, comprising:
at least one sequence of machine executable instructions;
a medium bearing the executable instructions in machine readable form, wherein execution of the instructions by one or more processors causes the one or more processors to:
retrieve a system file including tunables each having tunable setting with a new tunable value in response to a single administrator request;
simultaneously retrieve a persistent storage mechanism including tunables each having tunable setting with the new tunable value in response to the single administrator request; and
change a tunable value in the kernel with the new tunable value without needing any centralized interface changes and continuing to run the computer with the retrieved tunable value.

19. An article, comprising:
at least one sequence of machine executable instructions;
a medium bearing the executable instructions in machine readable form, wherein execution of the instructions by one or more processors causes the one or more processors to:
retrieve tunable settings stored in a system file;
rebuild the kernel using the retrieved tunable settings; and
update a persistent storage mechanism using the retrieved tunable settings without needing any centralized interface changes.

20. A computer system, comprising:
a processor; and
a memory coupled to said processor, the memory having stored therein sequences of instructions, which, when executed by said processor, causes said processor to perform the steps of:
update a system file including tunables each having tunable setting with a new tunable value in response to a single administrator request;
simultaneously update a persistent storage mechanism including tunables each having tunable setting with the new tunable value in response to the single administrator request; and
change a tunable value in the kernel with the new tunable value without needing any centralized interface chances and continuing to run the computer with the updated tunable value.

21. A computer system, comprising:
a processor; and
a memory coupled to said processor, the memory having stored therein sequences of instructions, which, when executed by said processor, causes said processor to perform the steps of:
update tunable settings stored in a system file;
rebuild the kernel using the retrieved tunable settings without needing any centralized interface changes; and
update a persistent storage mechanism using the retrieved tunable settings.

22. The method of claim 1, wherein the tunables can be made independently of each other.

23. The method of claim 1, wherein new tunables can be created without needing any centralized interface changes.

24. The method of claim 1, wherein a data structure is maintained that includes information about every tunable parameter.

25. The method of claim 24, comprising compiling the data structure into the kernel to initialize the data structure in a kernel registry.

26. The method of claim 1, wherein each tunable has an associated handler function.

27. The method of claim 1, comprising updating a tunable using SAM.

28. The method of claim 1, comprising updating a tunable using kmtune.

29. The method of claim 1, comprising updating a tunable using a kernel system call (API).

30. The method of claim 1, comprising using one of a SAM, kmtune and a kernel system call to update a tunable.

* * * * *

UNITED STATES PATENT AND TRADEMARK OFFICE
CERTIFICATE OF CORRECTION

PATENT NO. : 7,076,647 B2 Page 1 of 1
APPLICATION NO. : 09/875289
DATED : July 11, 2006
INVENTOR(S) : Steven Roth et al.

It is certified that error appears in the above-identified patent and that said Letters Patent is hereby corrected as shown below:

In column 13, line 20, delete "ti_Rags;" and insert -- ti_flags; --, therefor.

In column 16, line 28, in Claim 20, delete "chances" and insert -- changes --, therefor.

Signed and Sealed this

Twenty-eighth Day of July, 2009

JOHN DOLL
*Acting Director of the United States Patent and Trademark Office*